United States Patent
Bontu et al.

(10) Patent No.: US 10,673,558 B2
(45) Date of Patent: Jun. 2, 2020

(54) CONFIGURING TRANSMISSION PARAMETERS IN A CELLULAR SYSTEM

(71) Applicant: Telefonaktiebolaget LM Ericsson (publ), Stockholm (SE)

(72) Inventors: Chandra Sekhar Bontu, Nepean (CA); Michel Chauvin, Kanata (CA); Peter Hazy, Ottawa (CA); Michael McKenna, Richmond (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/081,308

(22) PCT Filed: May 18, 2016

(86) PCT No.: PCT/IB2016/052920
§ 371 (c)(1),
(2) Date: Aug. 30, 2018

(87) PCT Pub. No.: WO2017/153819
PCT Pub. Date: Sep. 14, 2017

(65) Prior Publication Data
US 2019/0028233 A1 Jan. 24, 2019

Related U.S. Application Data

(60) Provisional application No. 62/305,337, filed on Mar. 8, 2016.

(51) Int. Cl.
*H04W 4/00* (2018.01)
*H04L 1/00* (2006.01)
*H04B 17/336* (2015.01)

(52) U.S. Cl.
CPC ......... *H04L 1/0026* (2013.01); *H04B 17/336* (2015.01); *H04L 1/0003* (2013.01);
(Continued)

(58) Field of Classification Search
CPC ... H04L 1/0026; H04L 1/0003; H04L 1/0009; H04L 1/0061; H04L 1/0015; H04B 17/336
(Continued)

(56) References Cited

U.S. PATENT DOCUMENTS

2013/0170469 A1* 7/2013 Yu .................. H04L 1/0003
370/330
2013/0343290 A1 12/2013 Ren

OTHER PUBLICATIONS

International Search Report and Written Opinion of the International Searching Authority dated Dec. 9, 2016 and issued in corresponding PCT Application No. PCT/IB2016/052920, consisting of 11 pages.
(Continued)

*Primary Examiner* — Thai D Hoang
(74) *Attorney, Agent, or Firm* — Sage Patent Group

(57) ABSTRACT

A method and network node for performing link adaption are disclosed. In one embodiment, a channel state information, CSI, measurement is received from a wireless device. An information carrying capacity, ICC, over a number of scheduling blocks, SBs, for a plurality of modulation formats for a target criteria is determined based at least in part on the CSI measurement from the wireless device. A modulation format of the plurality of modulation formats with a maximum ICC is selected. A transport block size, TBS, is determined for the selected modulation format. Link adaptation is performed based on the determined TBS.

19 Claims, 7 Drawing Sheets

(52) U.S. Cl.
CPC .......... H04L 1/0009 (2013.01); H04L 1/0015 (2013.01); H04L 1/0061 (2013.01)

(58) Field of Classification Search
USPC ................. 370/329–330, 335–345, 347–349
See application file for complete search history.

(56) References Cited

OTHER PUBLICATIONS

Lei Wan et al., "A Fading-Insensitive Performance Metric for a Unified Link Quality Model" 2006 Wireless Communications and Networking Conference, (WCNC). IEEE Publisher; Location and Date of Conference: Las Vegas, NV, Apr. 3-6, 2006 consisting of 5 pages.

3GPP TS 36.211 V12.1.0 (Mar. 2014) 3rd Generation Partnership Project; Technical Specification Group Radio Access Network; Evolved Universal Terrestrial Radio Access (E-UTRA); Physical Channels and Modulation (Release 12), consisting of 120 pages.

3GPP TS 36.212 V10.9.0 (Sep. 2015) 3rd Generation Partnership Project; Technical Specification Group Radio Access Network; Evolved Universal Terrestrial Radio Access (E-UTRA); Multiplexing and Channel Coding (Release 10), consisting of 79 pages.

3GPP TS 36.213 V8.3.0 (May 2008) 3rd Generation Partnership Project; Technical Specification Group Radio Access Network; Evolved Universal Terrestrial Radio Access (E-UTRA); Physical Layer Procedures (Release 8), consisting of 45-pages.

3GPP TS 36.213 V12.4.0 (Dec. 2014) 3rd Generation Partnership Project; Technical Specification Group Radio Access Network; Evolved Universal Terrestrial Radio Access (E-UTRA); Physical Layer Procedures (Release 12), consisting of 225 pages.

3GPP TS 36.213 V10.9.0 (Feb. 2013) rd Generation Partnership Project; Technical Specification Group Radio Access Network; Evolved Universal Terrestrial Radio Access (E-UTRA); Physical Layer Procedures (Release 10), consisting of 126 pages.

\* cited by examiner

CONFIGURING TRANSMISSION PARAMETERS IN A CELLULAR SYSTEM

CROSS-REFERENCE TO RELATED APPLICATIONS

This application is a Submission Under 35 U.S.C. § 371 for U.S. National Stage Patent Application of International Application No.: PCT/IB2016/052920, filed May 18, 2016 entitled "CONFIGURING TRANSMISSION PARAMETERS IN A CELLULAR SYSTEM," which claims priority to U.S. Provisional Application No. 62/305,337, filed Mar. 8, 2016, entitled "CONFIGURING TRANSMISSION PARAMETERS IN A CELLULAR SYSTEM," the entireties of both of which are incorporated herein by reference.

FIELD

The present disclosure relates to wireless communications networks, and in particular, to performing wireless communication link adaptation.

BACKGROUND

In a typical cellular communication network, the network determines the transmission parameters for the downlink and uplink transmission parameters based on received channel state information (CSI) report(s) and received signal quality, respectively. The transmission parameters include the modulation and coding scheme (MCS), transmit power, transmission mode and number of transmission layers, etc.

In Third Generation Partnership Project Long-Term Evolution (3GPP LTE), the MCS is typically decided by the number of information bits (or physical layer payload) that can fit in a set of scheduled physical resource block (PRB) pairs such that the eventual packet transmission is successfully received at the destination with a predefined target probability. The packet error rate depends on the resulting code rate for the transmission which is defined as the ratio of the information bits to the number of raw bits that are transmitted over the channel. The number of raw bits allocated in the transmission is dependent on the size of the PRB set and the available resource elements (REs) available for data transmission in that PRB set.

As defined in Third Generation Partnership Project Technical Specification (3GPP TS) 36.213 version 12.4.0 ("3GPP TS 36.213"), section 7.1.7, the size of the transport block size (TBS) or physical layer payload size, or the number of information bits that are transmitted is determined using TBS tables defined in 3GPP TS 36.213 based on the PRB-pair assignment and the MCS decided for that transmission. The MCS index and the PRB-pairs assigned are sent to the wireless device in the downlink control information (DCI) included in the physical downlink control channel (PDCCH). The wireless device derives the TBS size from these indices. Therefore the TBS defined in section 7.1.7 of 3GPP TS 36.213 forms the basis of control information exchange between the wireless device and the network. Here PRB-pair, as defined 3GPP TS 36.211 consists of two PRBs in each slot of the LTE subframe. For example, in the case of a LTE normal cyclic prefix (CP) subframe (as opposed to an extended CP subframe), a PRB-Pair consists of 12 subcarriers in 14 OFDM symbols. These TBS tables defined in 3GPP TS36.213 serve as a basis for serval existing methods for link adaptation. In particular, link adaptation based on these TBS tables is described as follows. A wireless device is informed about the resource allocation by transmitting a Physical Downlink Control Channel (PDCCH) (using one of the Downlink Control Information (DCI) formats for example DCI-1A or DCI-2A, etc. as further described in Section 5.3.3.1 of 3GPP TS 36.213) as follows:

1. Modulation & Coding Scheme (MCS) using 5 bits to represent a value between 0 and 31. MCS indices are defined in Section 7.1.7.1 of 3GPP TS 36.213.
2. Resources in terms of PRB pairs using one of the resource allocation types 0, 1 or 2 as described in 3GPP TS 36.213.

The wireless device determines the Transport Block Size (TBS) based on the MCS and the number of PRB pairs provided in the PDCCH. The wireless device's determination of the TBS follows Section 7.1.7.2 of 3GPP TS 36.213. For example, as illustrated in Table 7.1.7.2.1-1 of 3GPP TS 36.213, the TBS can be derived with the help of two indices: I_TBS and N_PRB, where I_TBS can be derived from the MCS index and N_PRB represents the number of PRB pairs assigned to the wireless device.

Typically, a node such as an evolved NodeB (eNB) decides the MCS and N_PRB based on a target block error rate (BLER). To achieve this, the node uses the Channel Quality Indicator (CQI) feedback from the wireless device. Coding rate for a given MCS is computed from the number of Physical Resource Block (PRB) pairs assigned for an allocation. This relation of coding gain for PRB pair assignment is implicitly defined by Table 7.1.7.2.1-1 in 3GPP TS 36.213. For example, for TBS index, $I_{TBS}$, of 15 and number of PRBs, $N_{PRB}$, of 20, the modulation will be QAM16 and TBS=6200. The resulting code rate is (6200+CRC)/(REs available for data or PDSCH*bits per RE)=0.5939, when the resource elements (REs) available for data or PDSCH are 2640. The cyclic redundancy check, CRC=72 is computed based on the TBS as outlined in Section 5.1.1 of 3GPP TS 36.212. The node can estimate the BLER based on the derived coding rate and the CQI feedback. MCS and PRBs are selected such that this combination of coding rate & CQI meets the required BLER target.

Further, in general, the MCS is selected such that the transmission is successful with a target error rate for a given channel quality. As defined in 3GPP TS 36.213, the number of information bits, i.e. TBS, that can be sent is implicitly decided based on the MCS and PRBs assigned for the transmission. In this case, from the link quality and the minimum number of PRBs that can successfully transmit a predetermined number of information bits with a target packet error rate can be decided. The minimization of PRBs is derived over the available set of MCSs. This procedure is described as follows:

1. Packet error rate of a selected MCS for channel quality should be decided with code rate limitations imposed by the table 7.1.7 of 3GPP TS 36.213.
2. The code rate of the MCSs varies based on the number of PRBs assigned for the transmissions.
3. When there is more than one code word, MCS has to be decided independently for each code word (based on the channel quality of each code word) with the same number of PRBs.

An existing method to decide MCS is to have Chanel Quality Indicator (CQI) values which can satisfy a target error rate for the all MCSs for different channel conditions and decide the MCS by comparing the received or measured channel quality with the reference channel quality. However, this heuristic based link adaptation based on the TBS table defined in 3GPP TS 36.213 can become computationally inefficient, and non-optimal in performance for complex transmission scenarios. In particular, this existing link adaptation method is a very complex process because of the varying performance of various modulations and code rates under varying channel conditions.

SUMMARY

Some embodiments advantageously provide a method and system for performing link adaptation.

According to one aspect of the disclosure, a network node for performing link adaptation is provided. The network node includes processing circuitry. The processing circuitry includes a processor and a memory. The memory contains instructions that, when executed by the processor, configure the processor to: receive channel state information, CSI, measurement from a wireless device, determine an information carrying capacity, ICC, over a number of scheduling blocks, SBs, for a plurality of modulation formats for a target criteria based at least in part on the CSI measurement from the wireless device, select a modulation format of the plurality of modulation formats with a maximum ICC, and determine a transport block size, TBS, for the selected modulation format.

According to one embodiment of this aspect, the CSI measurement from the wireless device includes one of at least one channel quality indicator, CQI, value and at least one rank indicator. According to another embodiment of this aspect, the memory includes further instructions that, when executed by the processor, configure the processor to determine at least one signal-to-interference-plus noise ratio, SINR, value based on the at least one CQI value. According to another embodiment of this aspect, the memory includes further instructions that, when executed by the processor, configure the processor to determine a maximum code rate for each of the plurality of modulation formats that meets the target criteria based on the at least one SINR value.

According to another embodiment of this aspect, the determining the at least one SINR value includes selecting SINRs $\Gamma_0$ and $\Gamma_1$ such that $\Gamma_0 \leq \gamma_v(w,m) \leq \Gamma_1$, where $\gamma_v(w,m)$ is the at least one SINR that is determined, w is a code word and m is a modulation format. The maximum code rate is determined based on the following equation:
based on:

$$r_v(w, m) = f_m(\Gamma_0) + \frac{(f_m(\Gamma_1) - f_m(\Gamma_2))}{\Gamma_1 - \Gamma_2}(\gamma_v(w, m) - \Gamma_0)$$

where $r_v(w,m)$ is the maximum code rate, $f_m(\Gamma_i)$ represents a maximum code rate to achieve the target criteria, at SINR $\Gamma_i$ for modulation m. Function $f( )$ represents the mapping function for maximum code rate from SINR, which is represented by a look-up table, with discrete SINR points, for example with a resolution of $\delta$dB from a minimum SINR value of $\Gamma_{min}$ to a maximum SINR of $\Gamma_{max}$. According to another embodiment of this aspect, the determining the at least one SINR value includes selecting SINR $\Gamma_0$ that satisfies the following $$\Gamma_0 = \left\lfloor \frac{\gamma_v(w, m)}{\delta} + 0.5 \right\rfloor \delta,$$

where $\Gamma_0$ is an SINR, $\gamma_v$ is the at least one SINR that is determined, w is a code word, $\delta$ represents the SINR increment and $\lfloor \ \rfloor$ represents the floor( ) function. Alternatively ceil( ) function can also be used. The maximum code rate is determined based on the following equation: $r_v(w,m)=f_m(\Gamma_0)$, where $r_v(w,m)$ is a code rate, $f_m(\Gamma_0)$ represents the maximum code rate to achieve the target criteria, at SINR $\Gamma_0$ for modulation m, w is a code word and m is a modulation format and $f_m$ is function of obtaining the required code rate.

According to another embodiment of this aspect, the ICC determined for each of the plurality of modulation formats is determined based at least in part on the maximum code rate for the respective modulation format. According to another embodiment of this aspect, the target criteria include at least one of target packet error rate condition, packet throughput condition and packet delay condition. According to another embodiment of this aspect, the memory includes further instructions that, when executed by the processor, configure the processor to accumulate the ICC over the plurality of SBs for the modulation formats, the maximum ICC being the maximum accumulated ICC over the plurality of SBs.

According to another embodiment of this aspect, the memory includes further instructions that, when executed by the processor, configure the processor to accumulate the ICC over the plurality of SBs for the modulation formats separately for each code word based on the following equation:

$$B_n(w, m) = \left\lfloor \sum_{i=p[0]}^{p[n-1]} A_i(w, m) \right\rfloor$$

where $A_i(w,m)$ is the ICC of SB-i, code word w for modulation m, and the SB index i is incremented according to a preferred SB order represented by p[ ], the maximum ICC being the maximum accumulated ICC over the plurality of SBs. According to another embodiment of this aspect, the memory includes further instructions that, when executed by the processor, configure the processor to: sum the maximum accumulated ICC for a modulation format until the sum of the maximum accumulated ICC is greater than or equal to a required number of information bits to be assigned for transmission, and allocate a plurality of SBs corresponding to the sum of the maximum accumulated ICC that is greater than or equal to the required number of information bits to be assigned for transmission.

According to another embodiment of this aspect, the memory includes further instructions that, when executed by the processor, configure the processor to determine a modulation and coding scheme, MCS, based on an average code rate for the allocated plurality of SBs corresponding to the sum of the maximum accumulated ICC being greater than or equal to the required number of information bits to be assigned for transmission. The determined TBS is based on the average code rate and the allocated plurality of SBs corresponding to the sum of the maximum accumulated ICC being greater than or equal to the required number of information bits to be assigned for transmission. According to another embodiment of this aspect, the memory stores a TBS table that indicates a plurality of TBS values, each TBS value corresponding to a respective TBS index and number of physical resource blocks. The memory includes further instructions that, when executed by the processor, configure the processor to: determine a subset of the plurality of TBS values that are greater than a number of information bits to be assigned for transmission, and apply a target criteria metric using the subset of the plurality of TBS values to generate corresponding proximity values, and select an MCS corresponding to a proximity value closest to zero. The determined TBS is based on the selected MCS corresponding to the proximity value closest to zero and allocated plurality of SBs.

According to another embodiment of the disclosure, a method for a network node for performing link adaptation is provided. Channel state information, CSI, measurement is received from a wireless device. An information carrying capacity, ICC, is determined over a number of scheduling blocks, SBs, for a plurality of modulation formats for a target criteria based at least in part on the CSI measurement from the wireless device. A modulation format of the plurality of modulation formats with a maximum ICC is selected. A transport block size, TBS, is determined for the selected modulation format.

According to one embodiment of this aspect, the CSI measurement from the wireless device includes one of at least one channel quality indicator, CQI, value and at least one rank indicator. According to another embodiment of this aspect, at least one signal-to-interference-plus noise ratio, SINR, value is determined based on the at least one CQI value. According to another embodiment of this aspect, a maximum code rate for each of the plurality of modulation formats that meets the target criteria is determined based on the at least one SINR value. According to another embodiment of this aspect, the determining of the at least one SINR value includes selecting SINRs $\Gamma_0$ and $\Gamma_1$ such that $\Gamma_0 \leq \gamma_v(w,m) \leq \Gamma_1$, where $\gamma_v(w,m)$ is the at least one SINR that is determined, w is a code word and m is a modulation format. The maximum code rate is determined based on the following equation:

based on:

$$r_v(w, m) = f_m(\Gamma_0) + \frac{(f_m(\Gamma_1) - f_m(\Gamma_2))}{\Gamma_1 - \Gamma_2}(\gamma_v(w, m) - \Gamma_0)$$

where $r_v(w,m)$ is the maximum code rate, $f_m(\Gamma_i)$ represents a maximum code rate to achieve the target criteria, at SINR $\Gamma_i$ for modulation m. Function $f()$ represents the mapping function for maximum code rate from SINR, which is represented by a look-up table, with discrete SINR points, for example with a resolution of $\delta$dB from a minimum SINR value of $\Gamma_{min}$ to a maximu SINR of $\Gamma_{max}$. According to another embodiment of this aspect, the determining the at least one SINR value includes selecting SINR $\Gamma_0$ that satisfies the following equation:

$$\Gamma_0 = \left\lfloor \frac{\gamma_v(w)}{\delta} + 0.5 \right\rfloor \delta,$$

where $\Gamma_0$ is an SINR, $\gamma_v$ is the at least one SINR that is determined and w is a code word, $\delta$ represents the SINR increment, $\lfloor \ \rfloor$ represents the floor( ) function. The maximum code rate is determined based on the following equation: $r_v(w,m) = f_m(\Gamma_0)$, where $r_v(w,m)$ is a code rate, $f_m(\Gamma_0)$ represents the maximum code rate to achieve the target criteria, at SINR $\Gamma_0$ for modulation m, w is a code word and m is a modulation format and $f_m$ is function of obtaining the required code rate. According to another embodiment of this aspect, the ICC determined for each of the plurality of modulation formats is determined based at least in part on the maximum code rate for the respective modulation format. According to another embodiment of this aspect, the target criteria includes at least one of target packet error rate condition, packet throughput condition and packet delay condition.

According to another embodiment of this aspect, the ICC is accumulated over the plurality of SBs for the modulation formats, the maximum ICC being the maximum accumulated ICC over the plurality of SBs. According to another embodiment of this aspect, the memory includes further instructions that, when executed by the processor, configure the processor to accumulate the ICC over the plurality of SBs for the modulation formats separately for each code word based on the following equation:

$$B_n(w, m) = \left| \sum_{i=p[0]}^{p[n-1]} A_i(w, m) \right|$$

where $A_i(w,m)$ is the ICC of SB-i, code word w for modulation m, and the SB index i is incremented according to a preferred SB order represented by p[ ], the maximum ICC being the maximum accumulated ICC over the plurality of SBs.

According to another embodiment of this aspect, the maximum accumulated ICC for a modulation format is summed until the sum of the maximum accumulated ICC is greater than or equal to a required number of information bits to be assigned for transmission. A plurality of SBs corresponding to the sum of the maximum accumulated ICC that is greater than or equal to the required number of information bits to be assigned for transmission are allocated. According to another embodiment of this aspect, a modulation and coding scheme, MCS, is determined based on an average code rate for the allocated plurality of SBs corresponding to the sum of the maximum accumulated ICC being greater than or equal to the required number of information bits to be assigned for transmission. The determined TBS is based on the average code rate and the allocated plurality of SBs corresponding to the sum of the maximum accumulated ICC being greater than or equal to the required number of information bits to be assigned for transmission.

According to another embodiment of this aspect, a TBS table that indicates a plurality of TBS values is stored. Each TBS value corresponds to a respective TBS index and number of physical resource blocks. A subset of the plurality of TBS values that are greater than a number of information bits to be assigned for transmission are determined. A target criteria metric is applied using the subset of the plurality of TBS values to generate corresponding proximity values. An MCS corresponding to a proximity value closest to zero is selected. The determined TBS is based on the selected MCS corresponding to the proximity value closest to zero and allocated plurality of SBs.

According to another embodiment of the disclosure, a network node for performing link adaption is provided. The network node includes a link adaptation module configured to: receive channel state information, CSI, measurement from a wireless device, determine an information carrying capacity, ICC, over a number of scheduling blocks, SBs, for a plurality of modulation formats for a target criteria based at least in part on the CSI measurement from the wireless device, select a modulation format of the plurality of modulation formats with a maximum ICC, and determine a transport block size, TBS, for the selected modulation format.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
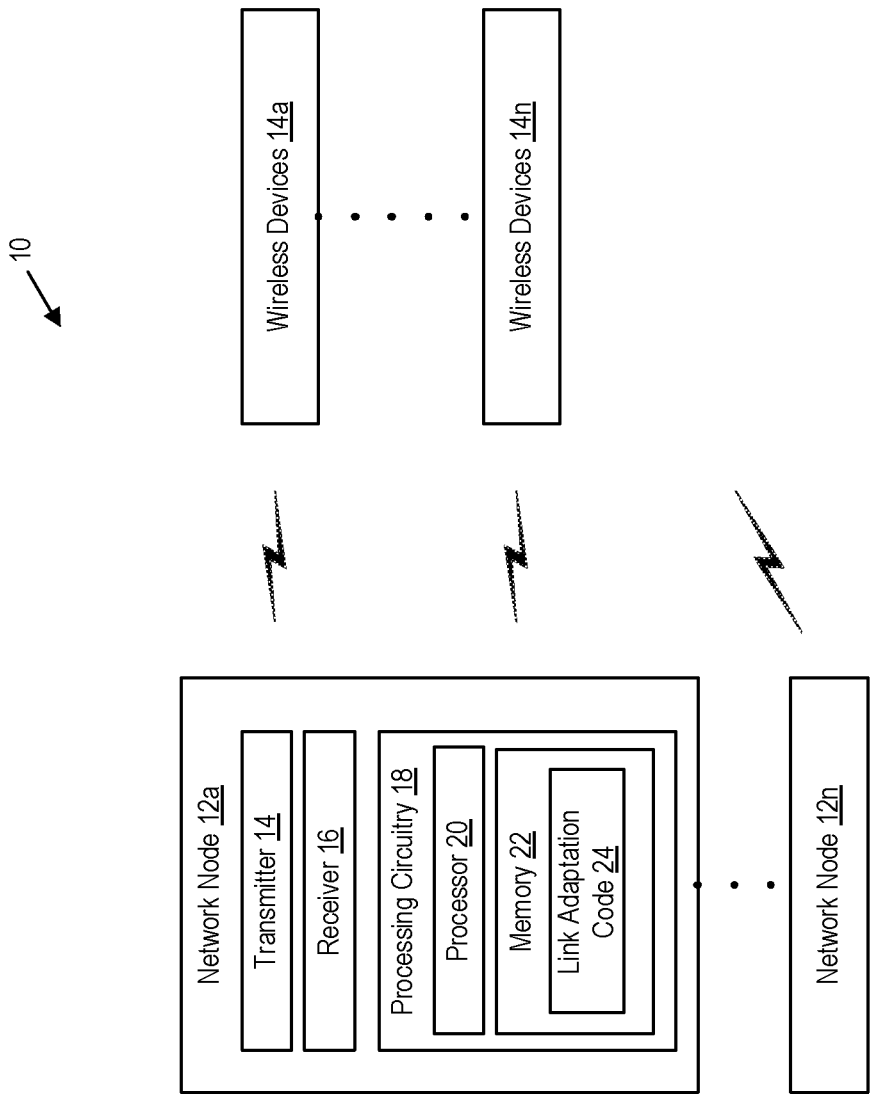
FIG. 1 is a block diagram of an exemplary system for performing link adaptation in accordance with the principles of the disclosure.

In one or more embodiments, a link adaptation process is presented that is based on a mutual information method. With this approach, the complexity of deciding the modulation and coding scheme (MCS) and the number of Physical Resource Blocks (PRBs) for various transmission scenarios can be significantly reduced when compared to existing methods. With the mutual information available for all the supported modulation formats for a given signal to interference plus noise ratio (SINR), information carrying capacity for all the modulation formats can be computed for an appropriate code rate to achieve a predetermined BLER before deciding the MCS and TBS as defined in Section 7.1.7.2 of 3GPP TS 36.213. After determining the modulation which can provide the maximum information transfer, the TBS table defined in Section 7.1.7.2 of 3GPP TS 36.213 can be used to decide the MCS and TBS. Furthermore, the link adaptation process described herein, with no significant changes, is advantageously applicable to adaptive/non-adaptive retransmissions, mixed retransmissions and new transmissions. According to one or more embodiments described herein, the received or measured Channel Quality Indicator (CQI) can be mapped to a code rate for each modulation. Based on the code rate, an estimate of the information payload size that fits in a PRB allocation can be determined. This estimate is used in determining the split of information between the different code words when there is more than one code word for transmission. When the spatial multiplexing with two code words is used for the transmission, the information carrying capacity can be computed for each of the code words based on the CQI values (or estimated SINR from the CQI), and the payload is accordingly distributed between the code words. Subsequently, MCS and TBS can advantageously be computed independently for each code word.

Before describing in detail exemplary embodiments that are in accordance with the disclosure, it is noted that the embodiments reside primarily in combinations of node/device components and processing steps related to link adaptation with reduced computational complexity. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to drawing figures in which like reference designators refer to like elements there is shown in FIG. 1 an exemplary system for performing link adaptation in accordance with the principles of the disclosure and designated generally as "10." System 10 includes one or more network nodes 12a-12n (collectively referred to as network node 12) and one or more wireless devices 14a-14n (collective referred to as wireless device 14) in communication with each other via one or more communication links, paths and/or networks. In one or more embodiments, network node 12 is an evolved NodeB (eNB), base station, radio base station, base transceiver station, remote radio unit (RRU), remote radio head (RRH), access point, among other types of nodes known in the art. In one or more embodiments, wireless device 14 is a radio communication device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art.

Network node 12 includes one or more transmitters 14 and one or more receivers 16 for communicating with wireless devices 14, other network nodes 12 and/or other entities in system 10 via one or more communication protocols such as LTE based communication protocols. In one or more embodiments, transmitter 14 and/or receiver 16 may be replaced with one or more communication interfaces for communicating signals, packets, etc.

Network node 12 includes processing circuitry 18. Processing circuitry 18 includes processor 20 and memory 22. In addition to a traditional processor and memory, processing circuitry 18 may comprise integrated circuitry for processing and/or control, e.g., one or more processors and/or processor cores and/or FPGAs (Field Programmable Gate Array) and/or ASICs (Application Specific Integrated Circuitry). Processor 20 may be configured to access (e.g., write to and/or reading from) memory 22, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 22 may be configured to store code executable by processor 20 and/or other data, e.g., data pertaining to communication, e.g., configuration and/or address data of nodes, etc.

Processing circuitry 18 may be configured to control any of the methods and/or processes described herein and/or to cause such methods and/or processes to be performed, e.g., by network node 12. Corresponding instructions may be stored in the memory 22, which may be readable and/or readably connected to processor 20. In one or more embodiments, wireless device 14 may include the corresponding components as described with respect to network node 12, but with size and performance being based on design need. In one or more embodiments, one or more steps, functions and/or processes described herein with respect to the link adaptation process may be performed by wireless device 14.

Processor 18 corresponds to one or more processors 18 for performing network node 12 functions described herein. Network node 12 includes memory 22 that is configured to store data, programmatic software code and/or other information described herein. Memory 22 is configured to store link adaptation code 24. For example, link adaptation code 24 includes instructions that, when executed by processor 20, causes processor 20 to perform the process discussed in detail with respect to FIGS. 2-6.

Figure 2:
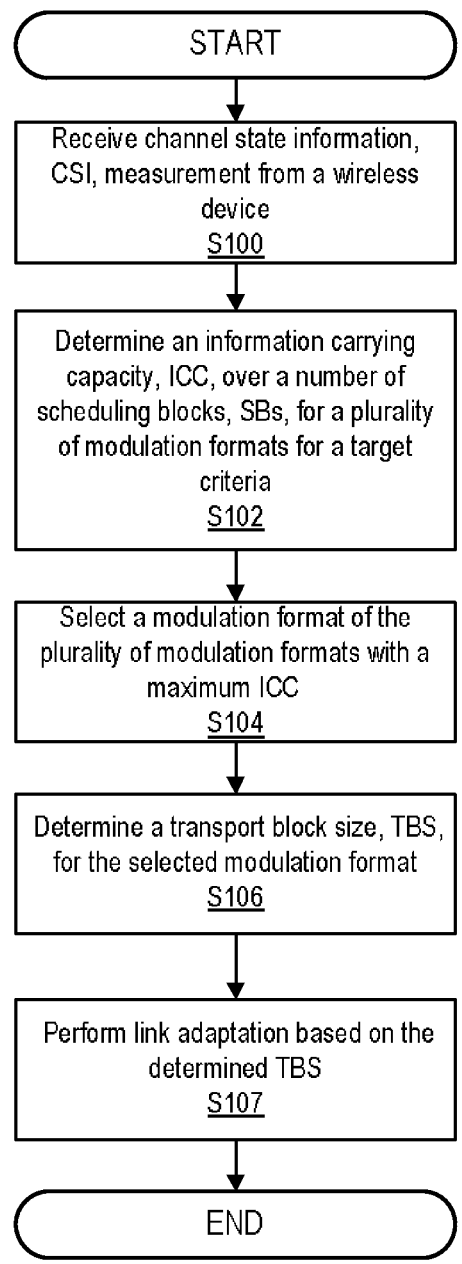
FIG. 2 is a flow diagram of one embodiment of an exemplary link adaptation process in accordance with the principles of the disclosure.

FIG. 2 is a flow diagram of one embodiment an exemplary link adaptation process of link adaptation code 24 in accordance with the principles of the disclosure. Processing circuitry 24 receives channel state information, CSI, measurement from wireless device 14 via receiver 16 (Block S100). In one or more embodiments, the CSI measurement from wireless device 14 includes at least one of at least one channel quality indicator, CQI, value and at least one rank indicator.

Processing circuitry 24 determines an information carrying capacity, ICC, over a number of scheduling blocks, SBs, for a plurality of modulation formats for a target criteria based at least in part on the CSI measurement from wireless device 14 (Block S102). For example, in one or more embodiments, processing circuitry 24 determines the information carrying capacity (ICC), i.e., $A_j(w,m)$ for the jth scheduling block (SB) for code word w and for each modulation format, m. ICC, $A_j(w,m)$ is computed for all the available SBs in a given system bandwidth using Equation 1:

$$A_j(w,m) = r_{v(j)}(w,m) * R_j * b_m, j=0, \ldots, N-1 \quad \text{(Eq. 1)}$$

In the above equation, v(j) represents the subband of the jth SB, $R_j$ represents the number of resource elements (REs) or sub-carriers available for data or PDSCH transmission, $b_m$ is the number of bits that can be carried by a RE or subcarrier based on the modulation format m, for example, $b_m = \{2, 4, 6, 8\}$ for QPSK, QAM-16, QAM-64 and QAM-256 respectively, $r_{v(j)}(w,m)$ is the maximum code rate for SB-j to achieve a target block/packet error rate (BLER/PER) at wireless device 14 decoder (not shown). Typically in an SB, some of the REs are used to transmit the reference symbols (RS), such as, the cell-specific reference symbols (CRS), Channel-State-Information Reference Symbols (CSI-RS), Demodulation Reference Symbols (DMRS), Primary/Secondary Synchronization Signals (PSS/SSS), Master Information Block (MIB), etc., and control information such as Physical Downlink Control Channel (PDCCH), Physical HARQ Indicator Channel (PHICH) on downlink, Synchronization Reference Symbols (SRS) on Uplink etc. The remaining REs/subcarriers are used for transmitting the data/Physical Downlink Shared Channel (PDSCH). As discussed above, the ICC is computed over the REs used for the transmission of data. In other words, $A_j(w,m)$ represents the number of information bits that can be transmitted in the SB-j to the receiver successfully meeting the target packer error rate/block error rate (BLER). In the above description, N SBs are assumed.

Processing circuitry 24 selects a modulation format of the plurality of modulation formats with a maximum ICC (Block S104). In one or more embodiments, processing circuitry 24, for each instant of accumulation over the SBs, selects the maximum ICC over all the modulations:

$$C_n(w) = \max_m B_n(w,m),$$

wherein $B_n(w,m)$ is a cumulative number of information bits that can be carried (or accumulated Information carrying capacity, ICC) by a scheduling block (SB) allocation in the order of subband preference. The maximum ICC corresponds to a modulation format. In one or more embodiments, $B_n(w,m)$ is defined by equation 2 below.

$$B_n(w,m) = \left[ \sum_{i=p[0]}^{p[n-1]} A_i(w,m) \right] \quad \text{Eq. 2}$$

where $A_i(w,m)$ is the ICC of SB-i, code word-w for modulation m. The SB index i is incremented according to a preferred SB order represented by p[ ]. The SB preference order may be defined by a resource scheduler of network node 12 (not shown) or other entity in system 10. For example, the resource scheduler may specify the order of the SBs based on the highest to lowest channel quality. In another example, the resource scheduler may prefer to order SBs according to the lowest to the highest subcarrier index. In one or more embodiments, processing circuitry 24 limits the ICC based on the code rate limitations specified in one or more communication standards. In one or more embodiments, the ICC is implicitly limited based on the code rate limitations specified in one or more communication standards. Processing circuitry 24 determines a transport block size, TBS, for the selected modulation format (Block S106). For example, in one or more embodiments, the TBS is determined based at least in part on the selected modulation format. One or more embodiments, the TBS and/or other information determined by network node 12 as described herein is signaled to wireless device 14 for use by wireless device 14. Processing circuitry 24 performs link adaptation based on the determined TBS (Block S107). For example, in one or more embodiments, link adaptation is performed using the determined TBS and modulation format.

Figure 3:
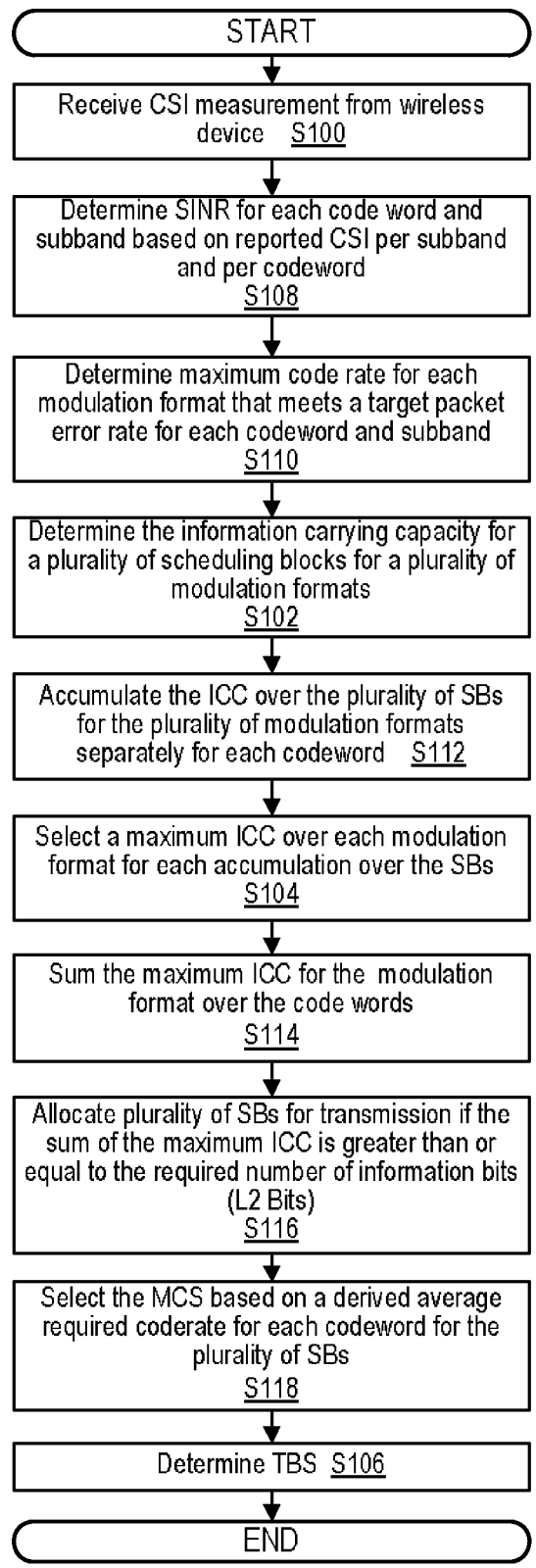
FIG. 3 is a flow diagram of another embodiment of an exemplary link adaptation process in accordance with the principles of the disclosure.

Another embodiment an exemplary link adaptation process of link adaptation code 24 in accordance with the principles of the disclosure is described with reference to the flow diagram of FIG. 3. Processing circuitry receives channel state information, CSI, measurement from wireless device 14 via receiver 16, as described above (Block S100).

Code Rate Computation from SINR

Processing circuitry 18 determines a signal-to-interference-plus-noise ratio (SINR) for each code word and subband based on reported CSI measurement per subband and per code word (Block S108). For example, in one or more embodiments, processing circuitry 24 maps the CQI reported by a wireless device to SINR $\gamma_v$ (w) for each codeword w & subband v. In one or more embodiments, the reported or measured CQI $c_v$ (w) per subband, v and per code word w is converted into SINR, $\gamma_v$(w). In one or more embodiments, implementation-specific correction factors also can be added to determine SINR $\gamma_v$(w).

Processing circuitry 24 determines a maximum code rate for each modulation format that meets a target packet error rate, i.e., one embodiment of a target criteria, for each code word and subband (Block S110). For example, in one or more embodiments, processing circuitry 24 determines the maximum code rate for each modulation format m to meet the target Block Error Rate (BLER) for each code word w and subband v. For example, the SINR is further mapped to a code rate $r_v$(w,m) mapping for each modulation m can be represented by a discrete function $f_m(\Gamma)$. A SINR to code rate mapping table, $f_m(\Gamma)$ can be pre-computed as illustrated below in Table 1 in the SINR range of $[\Gamma_{min}, \Gamma_{max}]$ with a resolution of δ. In the example of Table 1, $\Gamma_{min}$=−20 dB, $\Gamma_{max}$=33 dB and δ=1 dB.

TABLE 1

| | Required Code rate to achieve 10% Packet error rate: Code rate required to achieve 10% BLER, $f_m(\Gamma)$ for: | | | |
|---|---|---|---|---|
| SINR (dB) | QPSK | QAM-16 | QAM-64 | QAM-256 |
| −20 | 0 | 0 | 0 | 0 |
| −19 | 0 | 0 | 0 | 0 |
| −18 | 0 | 0 | 0 | 0 |
| −17 | 0 | 0 | 0 | 0 |
| −16 | 0 | 0 | 0 | 0 |
| −15 | 0.002686 | 0 | 0 | 0 |
| −14 | 0.006104 | 0 | 0 | 0 |
| −13 | 0.010498 | 0 | 0 | 0 |
| −12 | 0.015869 | 0 | 0 | 0 |
| −11 | 0.022705 | 0.001099 | 0 | 0 |
| −10 | 0.031006 | 0.004272 | 0 | 0 |
| −9 | 0.04126 | 0.008301 | 0.000651 | 0 |
| −8 | 0.053955 | 0.013428 | 0.003743 | 0 |
| −7 | 0.069336 | 0.019653 | 0.007568 | 0.002441 |
| −6 | 0.087891 | 0.027466 | 0.012288 | 0.005798 |
| −5 | 0.111084 | 0.036987 | 0.017822 | 0.009766 |
| −4 | 0.140137 | 0.048584 | 0.024658 | 0.014587 |
| −3 | 0.175049 | 0.0625 | 0.032878 | 0.020386 |
| −2 | 0.22168 | 0.078979 | 0.042399 | 0.0271 |
| −1 | 0.278564 | 0.098755 | 0.053548 | 0.03479 |
| 0 | 0.339844 | 0.123413 | 0.066569 | 0.043762 |
| 1 | 0.407227 | 0.151611 | 0.08138 | 0.053955 |
| 2 | 0.47876 | 0.1875 | 0.098226 | 0.065552 |
| 3 | 0.553955 | 0.232666 | 0.118978 | 0.078674 |
| 4 | 0.623535 | 0.282837 | 0.142334 | 0.093262 |
| 5 | 0.69165 | 0.335693 | 0.168132 | 0.110291 |
| 6 | 0.758301 | 0.389893 | 0.200846 | 0.129395 |
| 7 | 0.801758 | 0.447632 | 0.240641 | 0.14978 |
| 8 | 0.849365 | 0.502808 | 0.282633 | 0.172791 |
| 9 | 0.91626 | 0.567505 | 0.326335 | 0.19928 |
| 10 | 0.967285 | 0.621582 | 0.369385 | 0.231079 |
| 11 | 0.989014 | 0.680786 | 0.417399 | 0.26178 |
| 12 | 0.994873 | 0.741821 | 0.465658 | 0.299988 |
| 13 | 0.996094 | 0.783447 | 0.511475 | 0.333374 |
| 14 | 1 | 0.830811 | 0.56486 | 0.368591 |
| 15 | 1 | 0.880615 | 0.609294 | 0.408081 |
| 16 | 1 | 0.936768 | 0.659749 | 0.448364 |
| 17 | 1 | 0.977905 | 0.704427 | 0.487854 |
| 18 | 1 | 0.992432 | 0.756185 | 0.529846 |
| 19 | 1 | 0.99585 | 0.791178 | 0.574097 |
| 20 | 1 | 0.996216 | 0.834473 | 0.610046 |
| 21 | 1 | 1 | 0.880452 | 0.651489 |
| 22 | 1 | 1 | 0.932129 | 0.689575 |
| 23 | 1 | 1 | 0.973145 | 0.736755 |
| 24 | 1 | 1 | 0.989583 | 0.769592 |
| 25 | 1 | 1 | 0.995199 | 0.801453 |
| 26 | 1 | 1 | 0.996257 | 0.84137 |
| 27 | 1 | 1 | 1 | 0.888245 |
| 28 | 1 | 1 | 1 | 0.935852 |
| 29 | 1 | 1 | 1 | 0.97406 |
| 30 | 1 | 1 | 1 | 0.990356 |
| 31 | 1 | 1 | 1 | 0.995789 |
| 32 | 1 | 1 | 1 | 0.996277 |
| 33 | 1 | 1 | 1 | 1 |

In Table 1, the required code rate is derived to achieve a target packet error rate of ten percent for four modulation schemes, QPSK, QAM16, QAM64 and QAM256. An entry in this table is interpreted as follows: at a SINR 10 dB, using QAM-16, a packet can be transmitted with 0.1 probability of failure when the packet has 62.1582% of raw bits as information bits and 37.8418% of raw bits as redundancy bits. An entry in this table is further interpreted as follows: at a SINR 10 dB, using QAM-16, a packet with k information bits can be transmitted with 0.1 probability of failure when the packet has additional (0.378418/0.621582)*k error correcting or redundancy bits are provided. An entry in this table can also be interpreted as follows: at a SINR 10 dB, using QAM-16, a packet with number of information bits=0.621582*X*Y can be transmitted with probability of failure of 0.1, where X is a number of coded or raw bits that can be transmitted in one RE or subcarrier (=4 for QAM-16) and Y represents the number of resource elements (REs) available for PDSCH transmission in an allocation, 0.621582 is highlighted in bold in Table 1. For each code word and subband, the achievable code rate is computed using the SINR to code rate mapping table, $f_m(\Gamma)$. Similar tables can be derived for other target packet error rates or other target criteria, such as, throughput, packet delay, etc. For example, when a packet delay is the target criteria, the table can be derived such that the code rate can guarantee a specified packet delay with a defined confidence, e.g., 99.99%. The function f( ) for obtaining the required code rate for a target packet error rate can be, for example, obtained following the mutual information method that is known in the art. Another embodiment of Block S110 is discussed below with reference to FIG. 5. Processing circuitry 18 determines a maximum code rate for each modulation format that meets a target packet error rate for each code word and subband, as discussed above with respect to FIG. 2 (Block S102)

Cumulative Capacity per SB

Processing circuitry 18 accumulates the ICC over the SBs for all the modulation formats separately for each code word (Block S112). For example, in one or more embodiments, processing circuitry 24 computes the cumulative ICC over the SBs in a preferred order for all the modulations separately for each code word. In one or more embodiments, a cumulative number of information bits that can be carried (or cumulative Information carrying capacity, ICC) for n scheduling blocks (SBs) allocation in the order of subband preference can be computed as follows:

$$B_n(w, m) = \left\lfloor \sum_{i=p[0]}^{p[n-1]} A_i(w, m) \right\rfloor$$

where $A_i(w,m)$ is the ICC of SB-i, code word-w for modulation m. The SB index i is incremented according to a preferred SB order represented by p[ . . . ]. The SB preference order may be defined by the resource scheduler. For example, the resource scheduler may specify the order the SBs based on the highest to lowest channel quality. In another example, the resource scheduler may prefer to order SBs according to the lowest to the highest subcarrier index.

Limiting the Capacity

Figure 4:
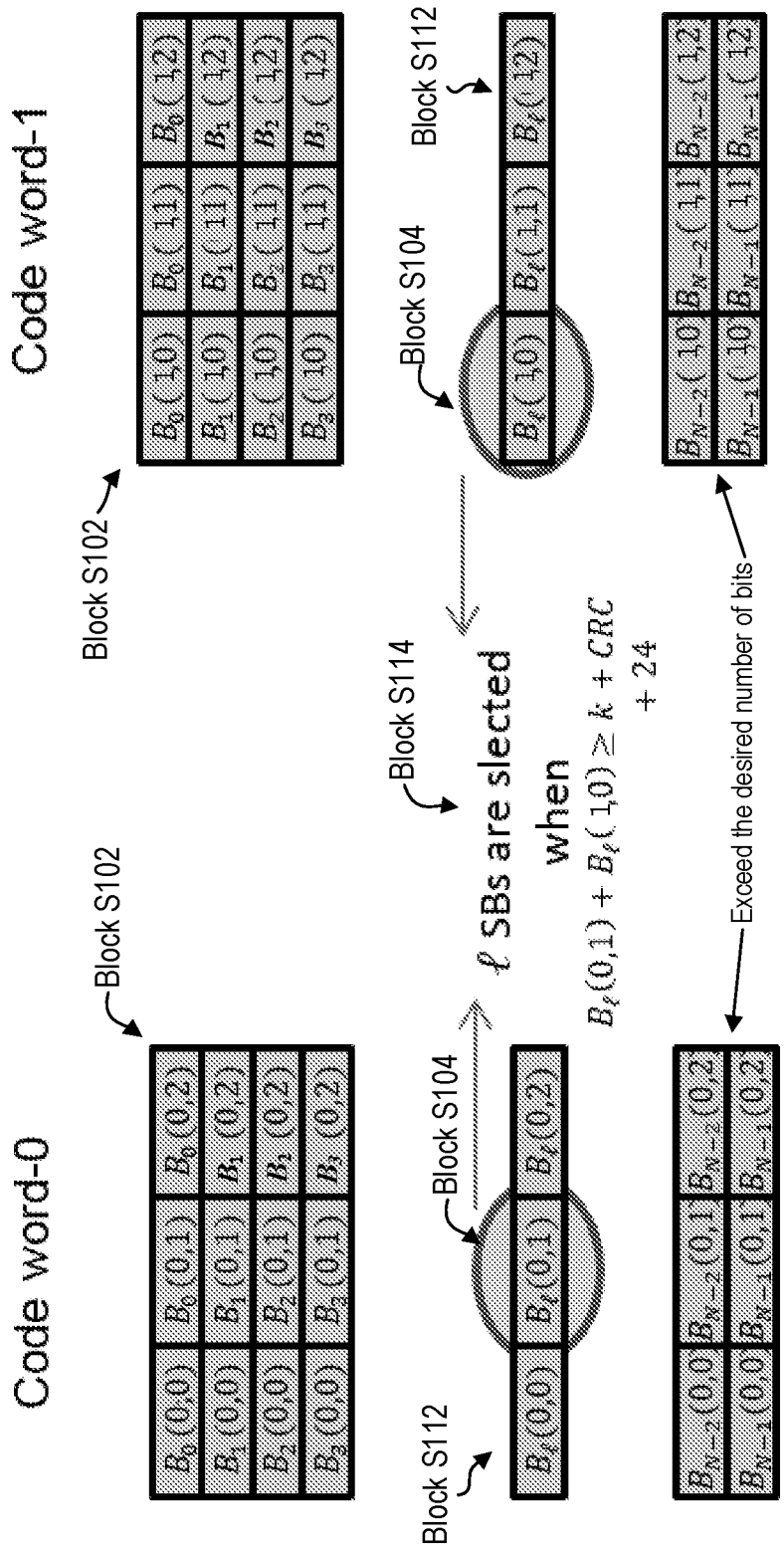
FIG. 4 is a block diagram of one embodiment for the selection of scheduling blocks in accordance with the principles of the disclosure.

Processing circuitry 18 selects a maximum cumulative ICC over all the modulations for each accumulation over the SBs, as discussed above with respect to FIG. 2 (Block S104). Processing circuitry 18 sums the maximum ICC for the selected modulation over the code words (Block S114). For example, in one or more embodiments, processing circuitry 24 sums the maximum ICC for the selected modulation $M_w$ over the code words equation: $D_n = \Sigma_w C_n(w)$, where $C_n(w)$ represents the accumulated ICC over n SBs in the order of specified priority for code word-w. $D_n$ represents the sum of the accumulated ICC over n SBs in the order of specified priority for all the code words. One example of the summing of the maximum ICC is illustrated in FIG. 4.

In one or more embodiments, the average code rate is limited by the maximum and minimum code rates imposed by the TBS table defined in 3GPP TS 36.213 as follows:

if $B_n(w,m)$ is greater than $B_n^{max}(m)$, $B_n(w,m)$ is replaced by $B_n^{max}(m)$. Otherwise the $B_n(w,m)$ is unchanged. In C language syntax, this logic can be represented as follows:

$$B_n(w,m) = (B_n(w,m) > B_n^{max}(m)) ? B_n^{max}(m) : B_n(w,m)$$

Similarly when $B_n(w, QPSK)$ is less than $B_n^{min}(QPSK)$, $B_n(w, QPSK)$ is replaced by $B_n^{min}(QPSK)$. Otherwise the $B_n(w, QPSK)$ is unchanged.

$$B_n(w, QPSK) = (B_n(w, QPSK) > B_n^{min}(QPSK)) ? B_n^{min}(QPSK) : B_n(w, QPSK)$$

$\{B_n^{max}(m), B_n^{min}(min)\}$ the maximum and minimum Transport Block Sizes (TBSs) plus cyclic redundancy check (CRC) allowed when n SBs are allocated for modulation m.

$$B_n^{max}(m) = maxTBS_n(m) + CRC$$

$$B_n^{min}(m) = minTBS_n(m) + CRC$$

The maximum ICC is limited for each modulation based on the maximum allowed code rate defined in the standards. The minimum ICC of the lowest modulation is limited by the minimum allowed code rate for Quadrature Phase-Shift Keying (QPSK). The minimum ICC of the other modulation formats is not limited to allow the algorithm to pick the robust modulation allowed by the TBS defined in the standards.

Selecting SBs

Processing circuitry 18 allocates SBs for transmission if the sum ICC is greater than or equal to the required number of information bits (L2 Bits) (Block S116). For example, in one or more embodiments, processing circuitry 24, when the sum ICC, $D\ell$, is greater than or equal to the required number of information bits (L2 bits), k, allocates $\ell$ SBs for the transmission.

The number of SBs required is determined as $\ell$ which is the minimum n which satisfies the following condition:

$$\max_m \{B_\ell(0, m)\} + \max_m \{B_\ell(1, m)\} \geq (k + CRC + 24)$$

where k represents the number of information bits that are intended to be assigned. If $\ell$ which can satisfy the above condition is not found, even after considering all the available SBs, N, i.e., all the required number of information bits cannot be transmitted due to lack of radio resources, the payload is limited as follows:

$$k + CRC + 24 = \max_m \{B_{N-1}(0, m)\} + \max_m \{B_{N-1}(1, m)\}$$

The modulation $m_w$, w=0,1 that correspond to the above condition are selected as the modulation for code word 0 and 1 respectively, as illustrated below.

$$k_w + CRC \leq \max_m \{B_{\ell-1}(w, m)\}$$

One example of the selection of SBs for two code word transmission is illustrated in FIG. 4.

When there is only one code word to transmit, i.e., when the transmission channel rank is only one, the number of SBs required is determined as $\ell$ which satisfies the following condition:

$$\max_m \{B_\ell(0, m)\} \geq (k + CRC)$$

where k represents the number of information bits that are intended to be assigned. If $\ell$ which can satisfy the above condition is not found, even after considering all the available SBs, N, i.e., all the required number of information bits cannot be transmitted due to lack of radio resources, the payload is limited as follows:

$$k + CRC = \max_m \{B_{N-1}(0, m)\}$$

In general, for $N_w$ code word transmission, the number of SBs required is determined as $\ell$ which satisfies the following condition:

$$\sum_{w=0}^{N_w-1} \max_m \{B_l(w,m)\} \geq (k + CRC + (N_w - 1)24)$$

where k represents the number of information bits that are intended to be assigned. If ℓ which can satisfy the above condition is not found, even after considering all the available SBs, N, the payload is limited as follows, (i.e., all the required number of information bits cannot be transmitted due to lack of radio resources):

$$k + CRC + 24 = \sum_{w=0}^{N_w-1} \max_m \{B_{N-1}(w,m)\}$$

In an alternate embodiment, a combination, C, of modulations for all the code words, is selected such that the following condition is minimized:

$$\left\{ \sum_{w=0}^{N_w-1} B_l(w, m_C(w)) \right\} - (k + CRC + (N_w - 1)24)$$

where $m_c$ (w) represents the modulation for code word w for combination C. For example for two codewords and three modulations, the number of conditions will be $3^2=9$.

Picking the MCS for Each Code Word

Figure 6:
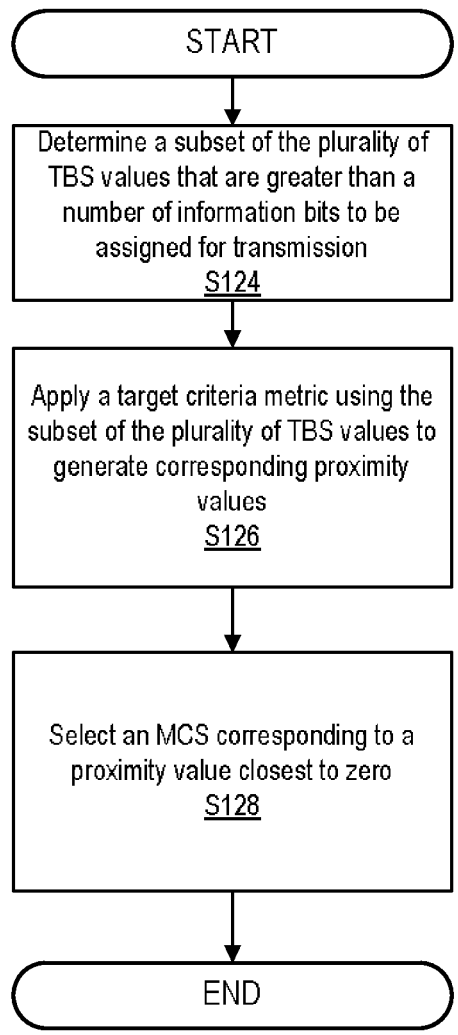
FIG. 6 is a flow diagram of another embodiment of an exemplary maximum code rate determination process in accordance with the principles of the disclosure.

Processing circuitry 24 selects the MCS of the selected modulation ($m_w$) based on a derived average required code rate for each code word for the selected SBs (Block S118). For example, in one or more embodiments, processing circuitry 24 selects the MCS based on the derived average required code rate for each code word for the selected ℓ SBs. In one or more embodiments, the process for deciding the MCS for each code word is illustrated in FIG. 6. Processing circuitry 18 determine a TBS for a selected modulation format, i.e., determines a TBS for the selected modulation format as discussed above with respect to FIG. 7 (Block S106). In other words, the TBS is determined based on the selected MCS and selected SBs.

FIG. 4 is a block diagram of one embodiment for the selection of scheduling blocks in accordance with the principles of the disclosure. In particular, FIG. 4 illustrates one embodiment where processing circuitry 18 performs Blocks S102, S104, S112 and S114 with two code words (code word-0 and code word-1) and four subbands v. For code word-0/1 and modulation 0, 1 and 2, equation 1 is applied for each of the four subbands. For example, applying equation 1 for code word 0 and modulation 0 results in $A_0(0,0)$. Processing circuitry 18 accumulates the ICC, i.e., $A_j(w,m)$, over the plurality of SBs for the plurality of modulation formats separately for each code word, i.e., performs Block S112. For example, applying equation 2 to code word-0 and modulation 0, results in $B_\ell(0,0)$ that is the summation of $B_0(0,0)$, $B_1(0,0)$, $B_2(0,0)$ and $B_3(0,0)$. In this embodiment, applying equation 2 to code word-0 and modulations 0, 1 and 2, results in $B_\ell(0,0)$, $B_\ell(0,1)$ and $B_\ell(0,2)$, as illustrated in FIG. 4. Equation 2 is also applied to code word 1 as illustrated in FIG. 4.

Processing circuitry 18 selects a modulation format of the plurality of modulation formats with a maximum ICC (Block S104). In one or more embodiments, processing circuitry 24, for each instant of accumulation over the SBs, selects the maximum ICC over all the modulations:

$$C_n(w) = \max_m B_n(w, m),$$

where $B_n(w,m)$, i.e., $B_\ell$ (w,m), is a cumulative number of information bits that can be carried (or accumulated Information carrying capacity, ICC) SB allocation in the order of subband preference. The max $B_n(w,m)$, i.e., max $B_\ell$ (w,m), is circled in FIG. 4. For example, in this embodiment, $B_\ell$ (0,1) is the maximum accumulated ICC for code word-0 and $B_\ell$ (0,0) is the maximum accumulated ICC for code word-1. Processing circuitry 18, in one or more embodiments of S114 and S116, sums the maximum ICC for the modulation format over the code words and allocates ℓ SBs for transmission when the sum of $B_\ell$ (0,1)+ $B_\ell$ (0,0)≥k+ CRC+24. The remaining Blocks of FIG. 3 are performed as described in FIG. 3. Further, $B_{n-2}$ (0,0), $B_{n-2}$ (0,1), $B_{n-2}$ (0,2), $B_{n-1}$ (0,0), $B_{n-1}$(0,1), and $B_{n-1}$(0,2) for code word-0, and $B_{n-2}$(1,0), $B_{n-2}$(1,1), $B_{n-2}$(1,2), $B_{n-1}$(1,0), $B_{n-1}$(1,1), and $B_{n-1}$(1,2) for code word-1 illustrate that the sum of cumulative ICCs of the codewords over all the available SBs may exceed the desired number of bits. ℓ SBs out of the available N SBs are selected when the sum of the cumulative ICC of the two code words exceeds the desired number of bits.

Figure 5:
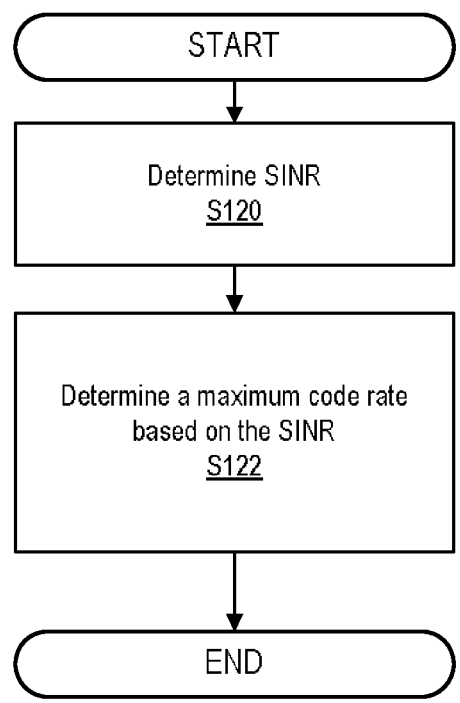
FIG. 5 is a flow diagram of one embodiment of an exemplary maximum code rate determination process in accordance with the principles of the disclosure.

FIG. 5 is a flow diagram of one embodiment of an exemplary maximum code rate determination process of Block S110 in accordance with the principles of the disclosure. Processing circuitry 18 determines SINR (Block S120). In a first embodiment, processing circuitry 18 determines SINR $\gamma_v$ (w,m) such that $\Gamma_0 \leq \gamma_v$ (w,m)$\leq \Gamma_1$, $r_v$(w,m) for w=0, 1 and m=0, 1, 2 for all subbands v, and $\Gamma_0$ and $\Gamma_1$ are the SINRs. $\Gamma_0$ and $\Gamma_1$, for example, can be obtained from Table 1 such that the criterion $\Gamma_0 \leq \gamma_v$ (w,m)$\leq \Gamma_1$ is satisfied. In a second embodiment for w=0, 1 and m=0, 1, 2 for all subbands v, processing circuitry 18 determines SINR $\gamma_v$ (w) based on the following equation:

$$\Gamma_0 = \left\lfloor \frac{\gamma_v(w)}{\delta} + 0.5 \right\rfloor * \delta,$$

where $\lfloor x \rfloor$ represents the floor(x). Instead of floor( ) function one can use ceil( ) function also. The maximum code rate derived using ceil( ) function may provide more optimistic estimate than the maximum code rate derived using floor. δ is the SINR resolution for the mapping function $f_m$( ).

Processing circuitry 18 determines a code rate based on the determined SINR (Block S122). In the first embodiment, processing circuitry 18 determines the maximum code rate based on the following equation:

$$r_v(w,m) = f_m(\Gamma_0) + \frac{(f_m(\Gamma_1) - f_m(\Gamma_2))}{\Gamma_1 - \Gamma_2}(\gamma_v(w,m) - \Gamma_0)$$

where $f_m(\Gamma_i)$ represents the maximum code rate to achieve a target BLER at SINR $\Gamma_i$ for modulation m as described above where function $f$( ) represents the mapping function for maximum code rate from SINR, which is represented by a look-up table (discussed herein), with discrete SINR points, for example with a resolution of δdB from a minimum SINR value of $\Gamma_{min}$ to a maximum SINR of $\Gamma_{max}$. Since the code rates are defined only for discrete values of SINR, $\Gamma_i$, the code rates are interpolated when the SINR is between two discrete values. In the second embodiment, processing circuitry 18 determines the maximum code rate based on the following equation: $r_v(w,m)=f_m(\Gamma_0)$, where $r_v(w,m)$ is code rate and $f_m(\Gamma_0)$ represents the maximum code rate to achieve a target BLER at SINR $\Gamma_0$ for modulation m as described above.

FIG. 6 is a flow diagram of another embodiment of an exemplary maximum code rate determination process in accordance with the principles of the disclosure. Processing circuitry 18 determines a subset of the plurality of TBS values that are greater than a number of information bits to be assigned for transmission (Block S124). For example, in one or more embodiments, processing circuitry 18 determines all rows, i.e., subset of rows, in TBS table where $TBS(m_w, \ell) \geq k_w$. In one or more embodiments, the TBS table is defined in in 3GPP TS 36.213.

Processing circuitry 18 applies a target criteria metric using the subset of the plurality of TBS values to generate corresponding proximity values (Block S126). For example, in one or more embodiments, processing circuitry 18 applies the following target criteria metric: $TBS(m_w, \ell) + CRC - B_n(w,m)$ to each of the subset of TBS values that met $TBS(m_w, \ell) \geq k_w$. The application of the target criteria metric results in a value that may be positive, zero or negative. Processing circuitry 18 selecting an MCS corresponding to a proximity value closets to zero (Block S128). In other words, the MCS is determined by analyzing a subset of TBS values from the TBS table defined in 3GPP TS 36.213, thereby reducing the complexity of the process while increasing performance as the proximity value closest to the zero indicates that TBS is mapped close to $B_n(w,m)$, i.e., TBS size+CRC maps closets to bits to be assigned for transmission.

Figure 7:
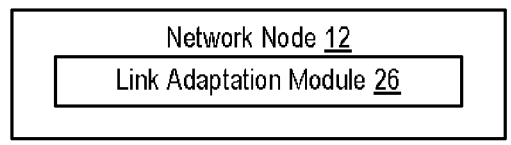
FIG. 7 is a block diagram of another embodiment of the network node in accordance with the principles of the disclosure.

FIG. 7 is a block diagram of another embodiment of exemplary network node 12. Network node includes link adaptation module 26 that is configured to perform the link adaptation process described above with respect to the execution of link adaption code 22 as described above with reference to FIGS. 2-6.

One or more embodiments of the disclosure describe one or more methods for link adaptation with reduced computational complexity when compared to existing methods. Furthermore, the one or more methods for link adaptation do not require significant changes to be applicable to adaptive/non-adaptive retransmissions, mixed retransmissions and new transmissions.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node for performing link adaptation, the network node comprising:
   processing circuitry, the processing circuitry including a processor and a memory, the memory containing instructions that, when executed by the processor, configure the processor to:
   receive channel state information, CSI, measurement from a wireless device, wherein the CSI measurement from the wireless device includes one of at least one channel quality indicator (CQI), value and at least one rank indicator;
   determine an information carrying capacity, ICC, over a number of scheduling blocks, SBs, for a plurality of modulation formats for a target criteria based at least in part on the CSI measurement from the wireless device;
   select a modulation format of the plurality of modulation formats with a maximum ICC;
   determine a transport block size, TBS, for the selected modulation format;
   perform link adaptation based on the determined TBS;
   determine at least one signal-to-interference-plus noise ratio, SINR, value based on the at least one CQI value;
   determine a maximum code rate for each of the plurality of modulation formats that meets the target criteria based on the at least one SINR value; and
   accumulate the ICC over the plurality of SBs for the modulation formats, the maximum ICC being the maximum accumulated ICC over the plurality of SBs.

2. The network node of claim 1, wherein determining the at least one SINR value includes selecting SINRs $\Gamma_0$ and $\Gamma_1$ such that $\Gamma_0 \leq \gamma_v(w,m) \leq \Gamma_1$, where $\gamma_v(w,m)$ is the at least one SINR that is determined, w is a code word and m is a modulation format; and
   the maximum code rate is determined based on the following equation:
   based on:

$$r_v(w, m) = f_m(\Gamma_0) + \frac{(f_m(\Gamma_1) - f_m(\Gamma_2))}{\Gamma_1 - \Gamma_2}(\gamma_v(w, m) - \Gamma_0)$$

where $r_v(w,m)$ is the maximum code rate, $f_m(\Gamma_i)$ represents a maximum code rate to achieve the target criteria, at SINR $\Gamma_i$ for modulation m.

3. The network node of claim 1, wherein determining the at least one SINR value includes selecting SINR $\Gamma_0$ that satisfies the following equation $$\Gamma_0 = \left\lfloor \frac{\gamma_v(w)}{\delta} + 0.5 \right\rfloor * \delta,$$

where $\Gamma_0$ is an SINR, $\gamma_v$ is the at least one SINR that is determined for code word w; and
   the maximum code rate is determined based on the following equation: $r_v(w,m) = f_m(\Gamma_0)$, where $r_v(w, in)$ is a code rate, $f_m(\Gamma_0)$ represents the maximum code rate to achieve the target criteria, at SINR $\Gamma_0$ for modulation m, $\delta$ is an SINR resolution for the mapping function $f_m$ and in is a modulation format.

4. The network node of claim 1, wherein the ICC determined for each of the plurality of modulation formats is determined based at least in part on the maximum code rate for the respective modulation format.

5. The network node of claim 1, wherein the target criteria includes at least one of target packet error rate condition, packet throughput condition and packet delay condition.

6. The network node of claim 1, wherein the memory includes further instructions that, when executed by the processor, configure the processor to:
   accumulate the ICC over the plurality of SBs for the modulation formats separately for each code word based on the following equation:

$$B_n(w, m) = \left\lfloor \sum_{i=p[0]}^{p[n-1]} A_i(w, m) \right\rfloor$$

where $A_i(w,m)$ is the ICC of SB-i, code word w for modulation m, and the SB index i is incremented according to a preferred SB order represented by p [ ], the maximum ICC being the maximum accumulated ICC over the plurality of SBs.

7. The network node of claim 1, wherein the memory includes further instructions that, when executed by the processor, configure the processor to:
   sum the maximum accumulated ICC for a modulation format until the sum of the maximum accumulated ICC is greater than or equal to a required number of information bits to be assigned for transmission; and
   allocate a plurality of SBs corresponding to the sum of the maximum accumulated ICC that is greater than or equal to the required number of information bits to be assigned for transmission.

8. The network node of claim 7, wherein the memory includes further instructions that, when executed by the processor, configure the processor to:
   determine a modulation and coding scheme, MCS, based on an average code rate for the allocated plurality of SBs corresponding to the sum of the maximum accumulated ICC being greater than or equal to the required number of information bits to be assigned for transmission; and
   the determined TBS being based on the average code rate and the allocated plurality of SBs corresponding to the sum of the maximum accumulated ICC being greater than or equal to the required number of information bits to be assigned for transmission.

9. The network node of claim 1, wherein the memory stores a TBS table that indicates a plurality of TBS values, each TBS value corresponding to a respective TBS index and number of physical resource blocks, the memory including further instructions that, when executed by the processor, configure the processor to:
   determine a subset of the plurality of TBS values that are greater than a number of information bits to be assigned for transmission;
   apply a target criteria metric using the subset of the plurality of TBS values to generate corresponding proximity values; and
   select a modulation and coding scheme, MCS, corresponding to a proximity value closest to zero; and the determined TBS being based on the selected MCS corresponding to the proximity value closest to zero and allocated plurality of SBs.

10. A method for a network node for performing link adaptation, the method comprising:
receiving channel state information, CSI, measurement from a wireless device, wherein the CSI measurement from the wireless device includes one of at least one channel quality indicator (CQI), value and at least one rank indicator;
determining an information carrying capacity, ICC, over a number of scheduling blocks, SBs, for a plurality of modulation formats for a target criteria based at least in part on the CSI measurement from the wireless device;
selecting a modulation format of the plurality of modulation formats with a maximum ICC;
determining a transport block size, TBS, for the selected modulation format;
performing link adaptation based on the determined TBS;
determining at least one signal-to-interference-plus noise ratio, SINR, value based on the at least one CQI value;
determining a maximum code rate for each of the plurality of modulation formats that meets the target criteria based on the at least one SINR value; and
accumulating the ICC over the plurality of SBs for the modulation formats, the maximum ICC being the maximum accumulated ICC over the plurality of SBs.

11. The method of claim 10, wherein determining the at least one SINR value includes selecting SINRs $\Gamma_0$ and $\Gamma_1$ such that $\Gamma_0 \leq \gamma_v(w,m) \leq \Gamma_1$, where $\gamma_v(w,m)$ is the at least one SINR that is determined, w is a code word and in is a modulation format; and
the maximum code rate is determined based on the following equation:
based on:

$$r_v(w, m) = f_m(\Gamma_0) + \frac{(f_m(\Gamma_1) - f_m(\Gamma_2))}{\Gamma_1 - \Gamma_2}(\gamma_v(w, m) - \Gamma_0)$$

where $r_v(w,m)$ is the maximum code rate, $f_m(\Gamma_i)$ represents a maximum code rate to achieve the target criteria, at SINR $\Gamma_i$ for modulation m.

12. The method of claim 10, wherein determining the at least one SINR value includes selecting SINR $\Gamma_0$ that satisfies the following equation:

$$\Gamma_0 = \left\lfloor \frac{\gamma_v(w)}{\delta} + 0.5 \right\rfloor * \delta,$$

where $\Gamma_0$ is an SINR, $\gamma_v$ is the at least one SINR that is determined for code word w; and
the maximum code rate is determined based on the following equation: $r_v(w,m)=f_m(\Gamma_0)$, where $r_v(w, in)$ is a code rate, $f_m(\Gamma_0)$ represents the maximum code rate to achieve the target criteria, at SINR $\Gamma_0$ for modulation m, $\delta$ is an SINR resolution for the mapping function $f_m$ and in is a modulation format.

13. The method of claim 10, wherein the ICC determined for each of the plurality of modulation formats is determined based at least in part on the maximum code rate for the respective modulation format.

14. The method of claim 10, wherein the target criteria includes at least one of target packet error rate condition, packet throughput condition and packet delay condition.

15. The method of claim 10, wherein the memory includes further instructions that, when executed by the processor, configure the processor to:
accumulate the ICC over the plurality of SBs for the modulation formats separately for each code word based on the following equation:

$$B_n(w, m) = \left| \sum_{i=p[0]}^{p[n-1]} A_i(w, m) \right|$$

where $A_i(w,m)$ is the ICC of SB-i, code word w for modulation m, and the SB index i is incremented according to a preferred SB order represented by p 1, the maximum ICC being the maximum accumulated ICC over the plurality of SBs.

16. The method of claim 10, further comprising:
summing the maximum accumulated ICC for a modulation format until the sum of the maximum accumulated ICC is greater than or equal to a required number of information bits to be assigned for transmission; and
allocating a plurality of SBs corresponding to the sum of the maximum accumulated ICC that is greater than or equal to the required number of information bits to be assigned for transmission.

17. The method of claim 16, further comprising:
determining a modulation and coding scheme, MCS, based on an average code rate for the allocated plurality of SBs corresponding to the sum of the maximum accumulated ICC being greater than or equal to the required number of information bits to be assigned for transmission; and
the determined TBS being based on the average code rate and the allocated plurality of SBs corresponding to the sum of the maximum accumulated ICC being greater than or equal to the required number of information bits to be assigned for transmission.

18. The method of claim 10, further comprising:
storing a TBS table that indicates a plurality of TBS values, each TBS value corresponding to a respective TB S index and number of physical resource blocks;
determining a subset of the plurality of TBS values that are greater than a number of information bits to be assigned for transmission;
applying a target criteria metric using the subset of the plurality of TBS values to generate corresponding proximity values; and
selecting a modulation and coding scheme, MCS, corresponding to a proximity value closest to zero; and
the determined TBS being based on the selected MCS corresponding to the proximity value closest to zero and allocated plurality of SBs.

19. A network node for performing link adaption, the network node comprising:
a link adaptation module configured to:
receive channel state information, CSI, measurement from a wireless device, wherein the CSI measurement from the wireless device includes one of at least one channel quality indicator (CQI), value and at least one rank indicator;
determine an information carrying capacity, ICC, over a number of scheduling blocks, SBs, for a plurality of modulation formats for a target criteria based at least in part on the CSI measurement from the wireless device;

select a modulation format of the plurality of modulation formats with a maximum ICC;
determine a transport block size, TBS, for the selected modulation format;
perform link adaptation based on the determined TBS;
determine at least one signal-to-interference-plus noise ratio, SINR, value based on the at least one CQI value;
determine a maximum code rate for each of the plurality of modulation formats that meets the target criteria based on the at least one SINR value; and
accumulate the ICC over the plurality of SBs for the modulation formats, the maximum ICC being the maximum accumulated ICC over the plurality of SBs.

* * * * *